(12) United States Patent
Brazier

(10) Patent No.: US 8,152,248 B2
(45) Date of Patent: Apr. 10, 2012

(54) TRACK DRIVE ASSEMBLY

(76) Inventor: Glen Brazier, Karlstad, MN (US)

( * ) Notice: Subject to any disclaimer, the term of this patent is extended or adjusted under 35 U.S.C. 154(b) by 159 days.

(21) Appl. No.: 12/157,078

(22) Filed: Jun. 6, 2008

(65) Prior Publication Data

US 2009/0302676 A1    Dec. 10, 2009

(51) Int. Cl.
*B65D 57/00* (2006.01)
*B62D 55/00* (2006.01)
(52) U.S. Cl. ......... 305/199; 305/131; 305/135; 305/195
(58) Field of Classification Search .............. 305/120, 305/124–125, 127–135, 143, 195, 199; 180/9.21
See application file for complete search history.

(56) References Cited

U.S. PATENT DOCUMENTS

| | | | | |
|---|---|---|---|---|
| 3,472,563 A | * | 10/1969 | Irgens | 305/112 |
| 3,510,174 A | * | 5/1970 | Lamb | 305/133 |
| 3,787,099 A | * | 1/1974 | Tucker et al. | 305/135 |
| 4,361,363 A | * | 11/1982 | Livesay | 305/125 |
| 5,273,126 A | * | 12/1993 | Reed et al. | 180/9.21 |
| 5,607,210 A | | 3/1997 | Brazier | |
| 5,749,423 A | * | 5/1998 | Burckhartzmeyer et al. | 180/9.54 |
| 6,000,766 A | * | 12/1999 | Takeuchi et al. | 305/160 |
| 6,074,025 A | * | 6/2000 | Juncker et al. | 305/130 |
| 6,129,426 A | * | 10/2000 | Tucker | 305/136 |
| 6,904,986 B2 | | 6/2005 | Brazier | |
| 7,131,508 B2 | | 11/2006 | Brazier | |
| 7,188,915 B2 | * | 3/2007 | Lemke et al. | 305/195 |
| 7,198,337 B2 | * | 4/2007 | Deckler et al. | 305/195 |
| 7,222,924 B2 | * | 5/2007 | Christianson | 305/135 |
| 7,416,266 B2 | * | 8/2008 | Soucy et al. | 305/195 |
| 2005/0035655 A1 | * | 2/2005 | Beckstrom et al. | 305/173 |

* cited by examiner

*Primary Examiner* — Jason Bellinger
(74) *Attorney, Agent, or Firm* — DL Tschida

(57) ABSTRACT

A track assembly having a drive sprocket capable of concentrically supporting several detachable drive rings containing drive teeth shaped to rotate without interfering with track support idler wheels, to provide a reduced center of gravity and substantially provide the same vehicle operating characteristic with tracks as with wheels. A track retainer guide member mounts along a peripheral edge of the track and overlies the track to resist track dislodgement. Independent and/or resiliently biased, rocker arms support track idler wheels to induce track flexion and conformance to encountered obstructions.

26 Claims, 7 Drawing Sheets

TRACK DRIVE ASSEMBLY

BACKGROUND OF THE INVENTION

The present invention relates to tracked vehicles and, in particular, to an improved track drive assembly for all terrain vehicles wherein the assembly height profile is varied with modular drive tooth sprocket rings having offset drive teeth, wherein a support frame guide prevents track dislodgement, and wherein independent, resiliently biased idler wheel rocker arms provide conformal track flexion to encountered obstacles.

A wide variety of personal, passenger and commercial all terrain vehicles have been developed for travel over terrains of all types, including stream and river beds, sand, sodden soil and swamp, rocks, snow and ice. Track assemblies have also been developed for converting wheeled vehicles into track vehicles. For example, track assemblies have been developed by applicant to convert wheeled passenger trucks and wheeled recreational all terrain vehicles (ATV) over to tracked vehicles able to operate over a wider range of terrains and operating conditions.

Conversion track assemblies have also been developed for commercial, industrial and military vehicles that include working attachments such as booms, blades, trenchers, cultivation equipment, mowers, and towed equipment used to perform specific tasks at remote locations. These work vehicles typically support at least two track assemblies from appropriate chassis mounted suspensions; more typically, four track assemblies are used to replace the wheels/tires at each axle. Representative assemblies of the foregoing type developed by applicant are shown at U.S. Pat. Nos. 7,131,508; 6,904,986 and 5,607,210.

Although the foregoing assemblies have proven beneficial, problems are occasionally encountered due to relatively high operating centers of gravity and accommodating operating or transportation height restrictions between work sites. That is, overhanging structures at a work site may prevent vehicle movement beneath the structure. Clearance problems can also exist in relation to bridges, high tension lines etc. during transport, necessitating track removal and re-mounting upon reaching a destination.

Occasionally too the drive tracks can dislodge where terrain conditions present unusual lateral forces that can force the track from the idler wheel and drive sprocket support assembly. Other track issues can also develop where the track is not able to flex and conform sufficiently on exceptionally rough terrain.

The present invention was developed to overcome the foregoing problems. The several different improved track assemblies particularly provide an improved track support assembly wherein the assembly height profile is altered to maintain a height profile at the vehicle that is substantially the same as when using wheels/tires. The height profile is particularly changed via modularly sized, offset drive tooth rings that mount to a supporting drive sprocket hub. Cooperating independent, idler wheel rocker arm suspensions improve track flexion at the track assembly and an associated track guide/retainer plate at the track support frame prevents track dislodgement.

SUMMARY OF THE INVENTION

It is a primary object of the invention to provide an all terrain vehicle with an improved drive sprocket capable of supporting multiple drive rings that contain offset drive teeth of differing tooth heights.

It is a further object of the invention to provide a vehicle wherein the drive teeth are shaped and/or spaced to cooperate with associated idler wheels (e.g. pass over and around the idler wheels).

It is a further object of the invention to provide a vehicle wherein the drive teeth are secured in lateral offset relation to a drive sprocket hub.

It is a further object of the invention to provide a vehicle wherein C-shaped drive teeth span between displaced, parallel rings and one of which rings fastens to a center hub of a drive sprocket.

It is a further object of the invention to provide a track support framework that includes a retainer guide member that mounts substantially adjacent the peripheral edge of the track and also overlies a portion of the track to prevent lateral dislodgement of the track.

It is a further object of the invention to provide several resiliently biased, idler wheel rocker arm suspensions that support the track to provide independent and conformal track flexion upon encountering obstacles.

The foregoing objects, advantages and distinctions of the invention are obtained in improved drive track assemblies shown at the attached figures. In one assembly, the track support framework provides a sprocket that concentrically supports several detachable drive tooth containing rings. Each drive ring comprises a pair of annular rings supported in displaced parallel relation. Spanning between the rings are C-shaped teeth that extend with differing radial offsets or heights from a center sprocket hub. The shape and offset of the teeth permits the teeth to contact drive lugs at the drive track yet pass over and clear idler wheels that support the track. The modular drive rings provide an ability to maintain a vehicle's height profile to be substantially the same as with wheels relative to attached tools. The track assemblies also maintain a low center of gravity at the vehicle and ensure substantially the same vehicle operating speeds as with wheels.

The track support framework also includes a retainer or guide member mounted along a lateral side of the framework substantially adjacent the peripheral edge of the track. A portion of the guide member overlies the track to prevent lateral dislodgement of the track. The retainer is supported to a tubular cross member arm of the track framework and an idler wheel support axle. A second flanged portion of the guide member projects laterally outward at an angle to prevent wear on the track, if contacted, direct the track back onto the framework, and direct debris away from the track assembly.

Also provided at the track assembly is a resiliently biased outer rocker arm assembly coupled to center sets of idler wheels. Inner and outer rocker arms independently pivot from the track framework. The outer rocker arm suspension is biased with flexibly compressible elastomer or bladder members and the inner suspension is either unbiased or spring biased. The independent, idler wheel rocker arm suspensions facilitate track flexion with encountered obstacles and a smoother vehicle riding characteristic. That is, the track is able to flex and conform to encountered obstacles, yet maintain a low center of gravity.

Still other objects, advantages, distinctions, constructions and combinations of individual features of the invention will become more apparent from the following description with respect to the appended drawings. Similar components and assemblies are referred to in the various drawings with similar alphanumeric reference characters. The description to each combination should therefore not be literally construed in limitation of the invention. Rather, the invention should be interpreted within the broad scope of the further appended claims.

BRIEF DESCRIPTION OF THE DRAWINGS

The following figures disclose presently preferred constructions of the invention. Similar components and assemblies are referred to in the various drawings with similar alphanumeric reference characters and callouts.

DESCRIPTION OF THE PREFERRED EMBODIMENT

The present invention finds application with a variety of industrial and commercial all terrain vehicles (ATV) having a chassis that typically supports four improved track assemblies 10 of the invention. A suitable operator and/or passenger compartment or body is typically supported by the chassis. The track assemblies 10 allow the vehicle to traverse wide ranging types of terrain and ground conditions, including streams, mud, rocky terrain, timbered terrain, sand, and snow and ice covered terrain.

Hydraulically controlled tool assemblies (e.g. blade assembly, bucket, boom, trencher etc.) are typically secured to the vehicle to accommodate defined work functions. A variety of alternative tool assemblies can be outfitted to the vehicle. A variety of tool assemblies can also be or towed by the vehicle and derive operating power through a hydraulic coupling with the engine.

The track assemblies 10 couple to driven or passive axles 8 that laterally extend from the chassis. Typically, the axles 8 are independently driven and may include intervening power transfer assemblies such as planetary gearing, universal joints or the like. Most typically the axles 8 are powered but some can be passively coupled and merely follow vehicle motion. Wheels can also be fitted to some of the axles 8. More typically, each axle 8 supports one of the present track assemblies 10 since they enhance the operational capabilities of the vehicle.

The track assemblies 10 are presently constructed to provide a relatively low or squat profile in contrast to predecessor track conversion assemblies 10 sold by applicant. The reduced height profile lowers the center of gravity of the vehicle which stabilizes the vehicle. The flexibility in varying the height profile of the assembly 10 allows the user to maintain a substantially identical relative ride height between a wheel supported and a track supported vehicle and any operating attachments. The relatively large drive sprocket also substantially maintains a top operating speed for the vehicle regardless of wheel or track configuration. The vehicle is also more readily transported and able to operate at sites with vehicle height requirements.

Figure 1:
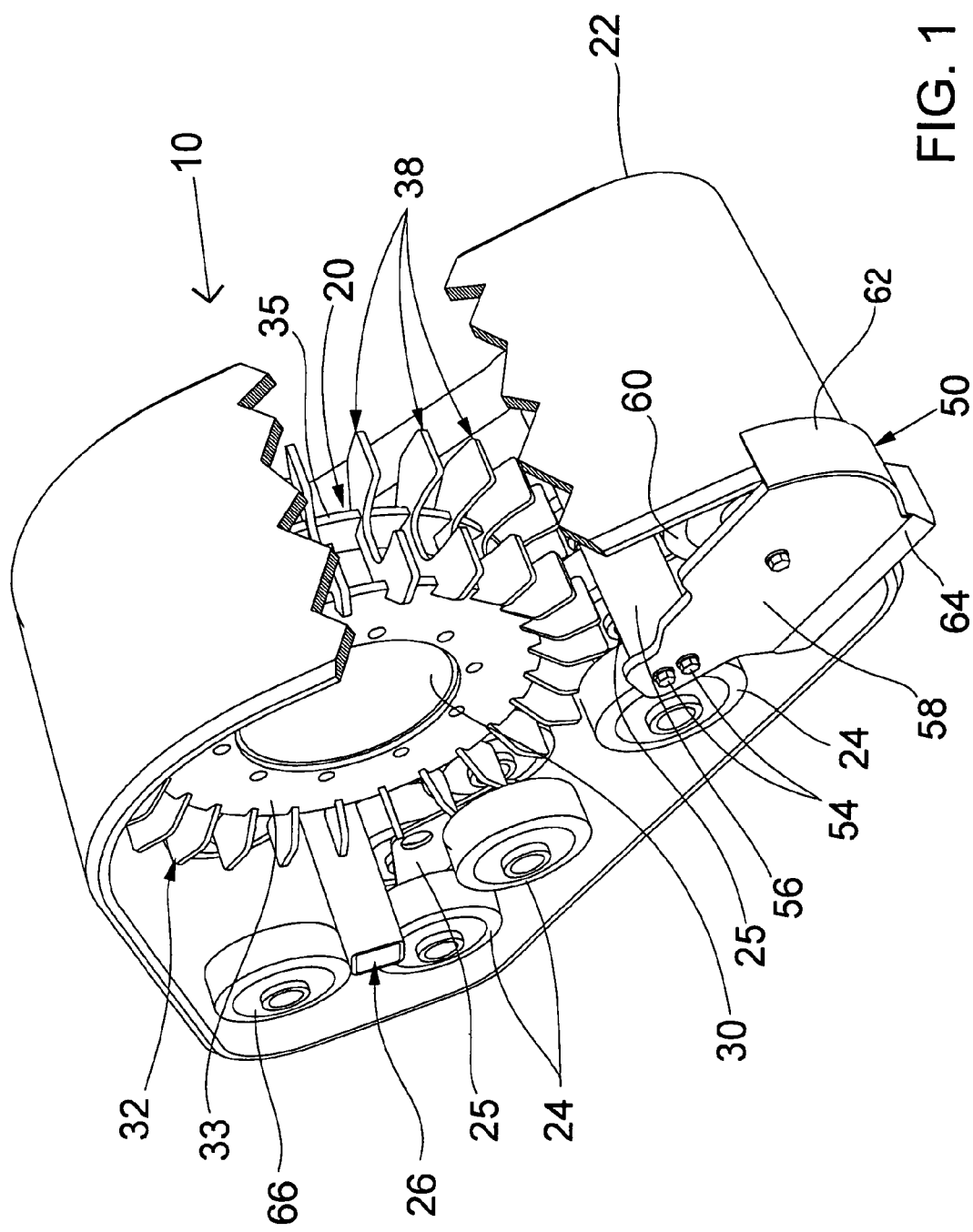
FIG. 1 is a perspective drawing shown in partial cutaway to expose an improved, offset toothed track drive sprocket and an associated track retainer guide at the track assembly support frame.
Figure 2:
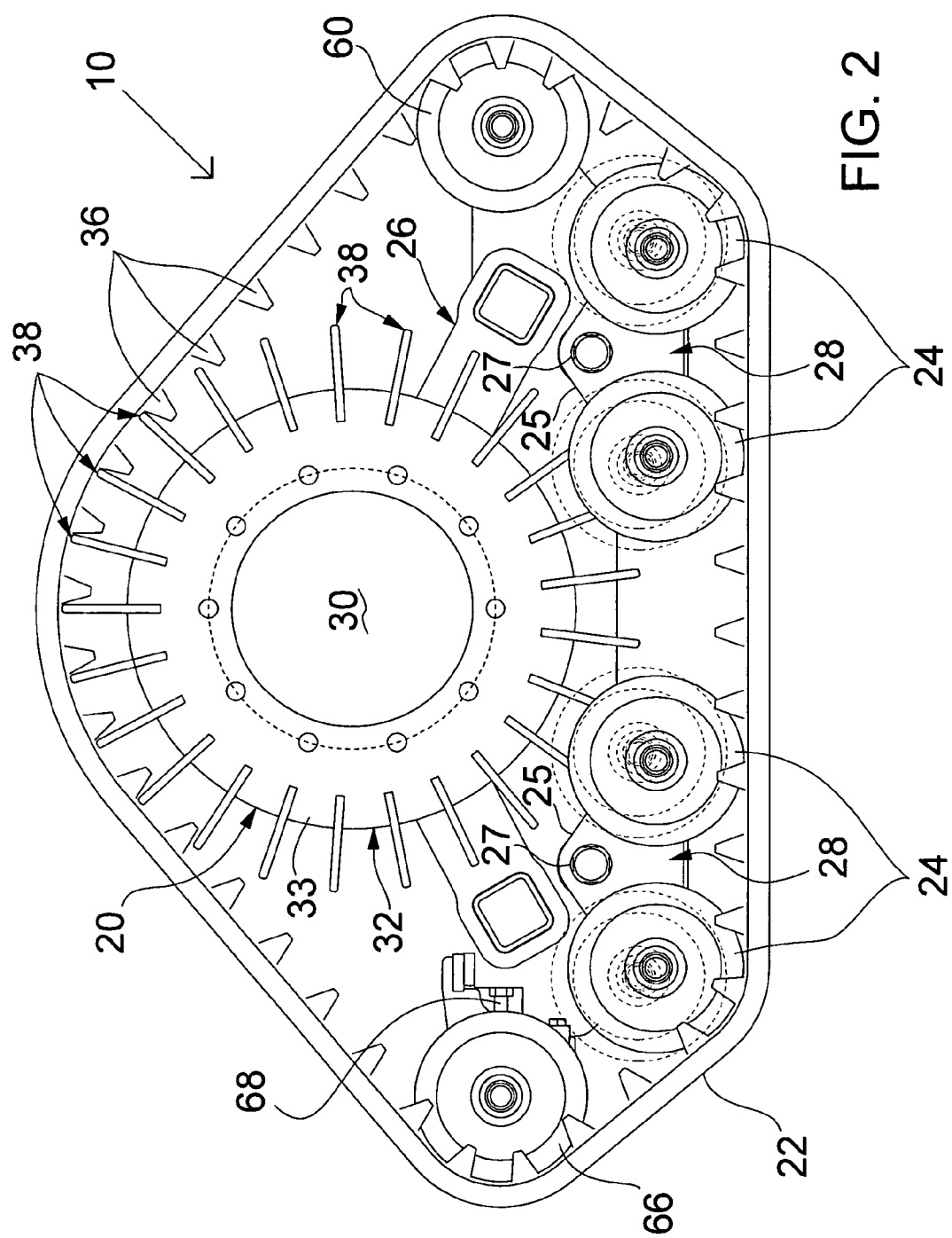
FIG. 2 is a front plan view to the track assembly depicting a reduced height profile and alternative movement conditions of rocker arm mounted track support idler wheels.
Figure 3:
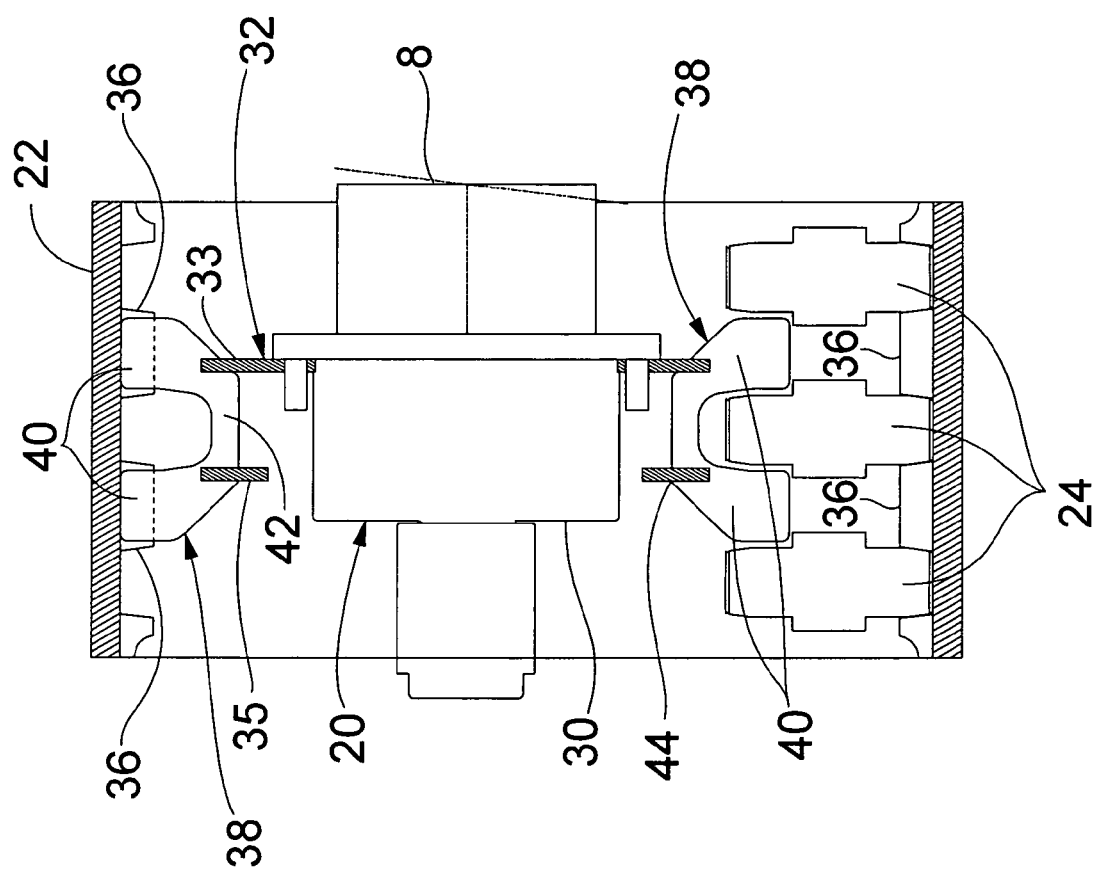
FIG. 3 is a cross section side view of the track assemblies of FIGS. 1 and 2.
Figure 4:
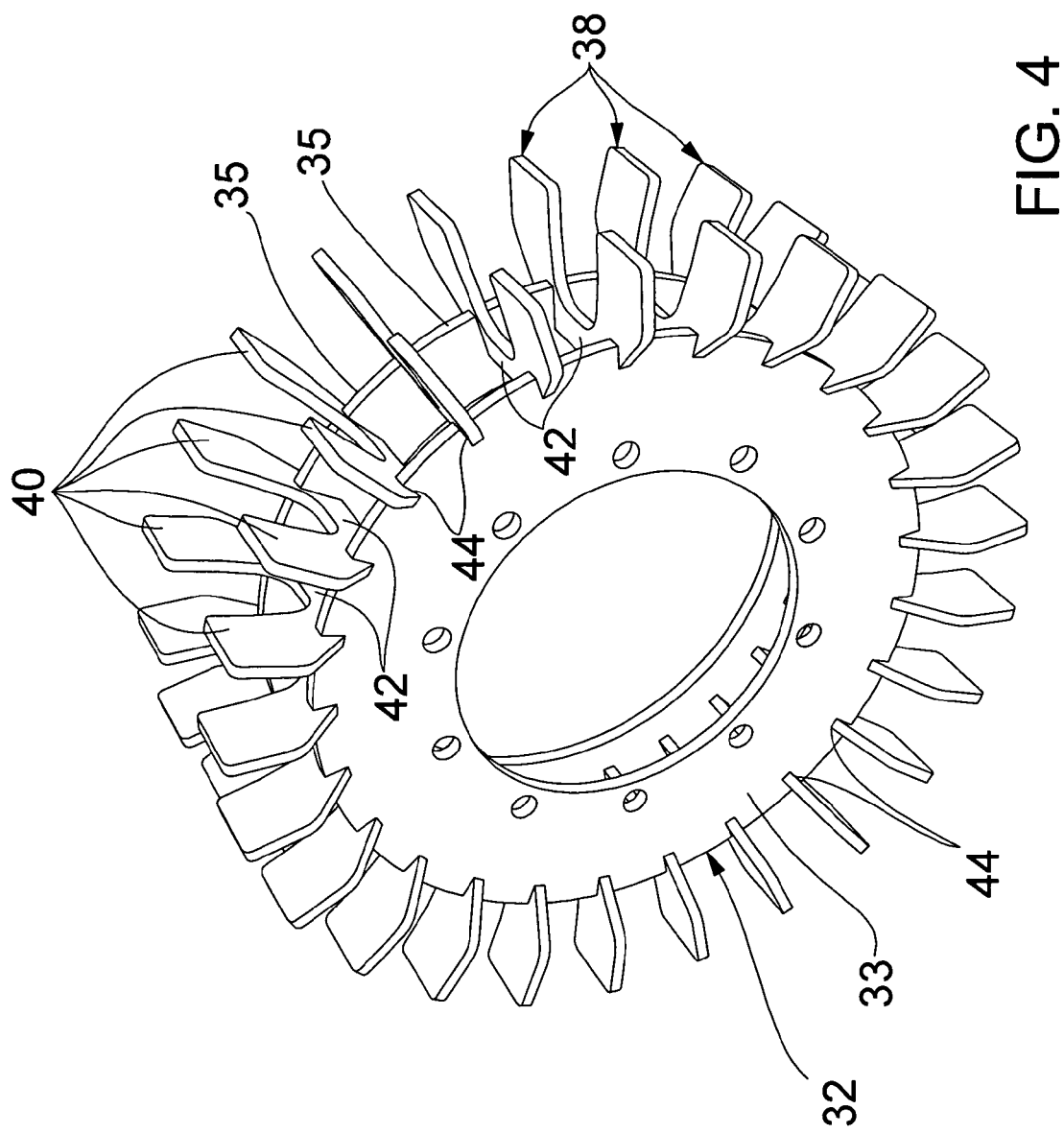
FIG. 4 is a perspective drawing showing the drive sprocket removed from the track assembly.

The enhanced variable height profile characteristic of the track assembly 10 is achieved with an improved drum-shaped, drive sprocket assembly 20 that drives the track 22. The configurations of the ground engaging lugs of the track 22 are not shown for convenience. FIGS. 1 through 3 depict detailed views to the improved track assembly 10 removed from a support vehicle. The track 22 is trained about the drive sprocket assembly 20 and several sets of adjacent idler wheels 24 that are mounted to a support framework 26. Forward and aft sets of the idler wheels 24 that span the track 22 are supported from unbiased or biased rocker arm assemblies 28 that induce the track 22 to flex and conform to the terrain as shown in dashed line to alternative idler wheel positions at FIG. 2.

Each rocker arm assembly 28 includes a rocker arm 25 that pivots about a pivot axle 27 fitted to the framework 26. Two sets of three laterally displaced idler wheels 24, six wheels 24 in total, are supported from each axle 27 at the rocker arms 25 and interlaced with two columns of drive lugs 36 and the drive teeth 38, reference FIG. 3 and as discussed below. When a resilient biasing member is included, it typically comprises a coiled spring or a compressively resilient elastomer member that is positioned between each rocker arm 25 and the framework 26 to bias the rocker assemblies 28 to an equilibrium condition. Bi-directional bias mechanisms can be included. An alternative track assembly having inner and outer rocker arm assemblies 28 and 82 is shown and discussed below with respect to FIG. 7. The rocker arm assembly 82 can be used alone or combined with the assemblies 28.

Approximately centered at the framework 26 is the drive sprocket assembly 20. The sprocket assembly 20 includes a center hub 30 that attaches to a planetary gear assembly and vehicle axle 8. A track drive ring assembly 32 concentrically attaches to the hub 30. A mounting ring 33 fastens the sprocket assembly 20 to the hub 30. In lieu of a solid mounting ring 33, several spokes 33 can radiate from the hub 30 to support the drive ring assembly 32.

The drive ring assembly 32 supports a number of drive teeth 38 that span the width of the sprocket 20 and interact with drive lugs 36 that project from the interior surface of the track 22 to propel the track 22. Laterally displaced from the mounting ring 33 is a parallel, annular tooth support ring 35.

Plate-like drive teeth 38 span between the rings 33 and 35 and include shaped tooth protrusions 40 that engage the track drive lugs 36. The tooth protrusions 40 project from ends of an intermediate depressed connecting link 42 such that the teeth 38 collectively exhibit a "C-shape". The teeth 38 can exhibit a variety of shapes so long as they can rotate around and between and/or generally not strike the idler wheels 24, see FIG. 3. The teeth 38 are welded to the rings 33 and 35 at slots 44 formed into the links 42.

The width of the links 42 and radial projection of the tooth protrusions 40 are tailored to form a channel space that allows the teeth 38 to engage the drive lugs 36 yet pass over and between the interlaced lower lying track idler wheels 24 supported to the framework 26 as shown in the lower portion of the cross section view of FIG. 3. Drive ring assemblies 32 of differing diameters and/or having drive teeth 38 of differing widths and lengths of protrusions 40 can be fitted to the hub 30 to accommodate a preferred height profile at the track assembly 10 and center of gravity at the vehicle 2.

Collectively, the improved sprocket assemblies 20 fitted with an appropriate drive ring 32 reduces the center of gravity and improves the stability of the vehicle. The selection of the proper diameter drive ring 32 particularly ensures the ride height of the vehicle and general vehicle operating characteristics will be substantially the same whether supported from wheels and tires or the track assemblies 10. The mounting and support heights of any attached tools and equipment are also thereby made substantially universal. The use of a large diameter sprocket assembly 20 also substantially maintains the operating top speed of the vehicle.

Figure 5:
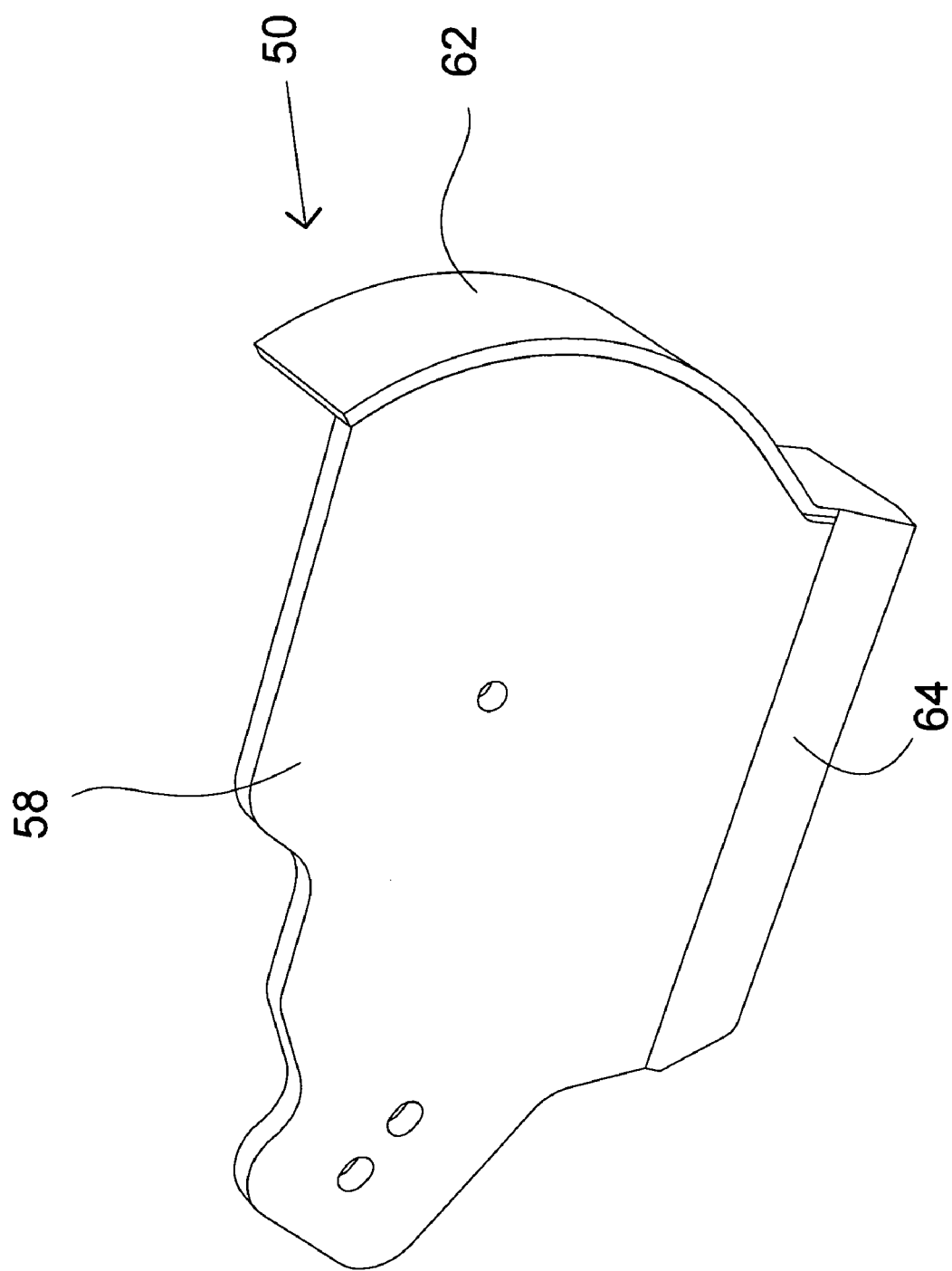
FIG. 5 is a perspective view showing front and right side views of the track guide/retainer removed from the track assembly.
Figure 6:
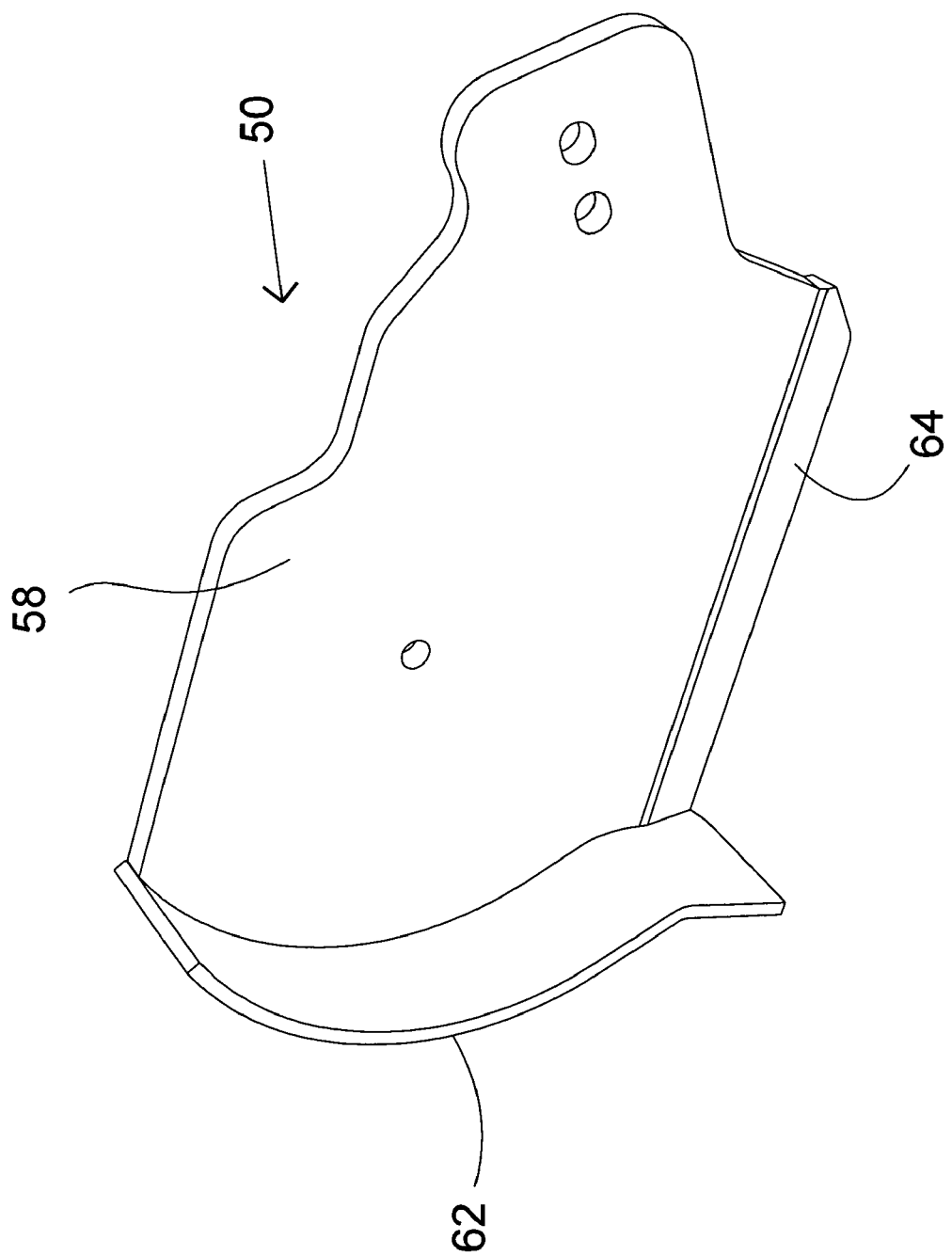
FIG. 6 is a perspective view showing rear and left side views of the track guide retainer removed from the track assembly.

FIGS. 1, 5 and 6 depict another improvement to the track assembly 10 which is a track retainer guide 50 that is fitted to the support framework 26. The retainer guide 50 mounts to lie substantially adjacent and parallel to a lateral peripheral edge of the track 22 and over a portion of the track 22. A flat plate portion 58 of the retainer 50 is secured with fasteners 54 to the framework 26 at a tubular arm 56 that laterally extends from the framework 26. The plate member 58 radially projects from the arm 56 and is separately secured with other fasteners 54 to the framework 26 aft of idler wheel 60.

A nose piece 62 of the guide 50 separately extends laterally over the aft end of the track 22 and an underlying idler wheel 60. The idler wheel 60 is mounted to a supporting axle and the framework 26. The plate 58 and nose piece 62 capture and engage the track 22 to prevent track dislodgement or runoff during normal track rotation.

A diverter flange 64 projects transversely at an angle in the range of 20° to 50° from the bottom edge of the plate 58. If the track 22 does start to dislodge, the diverter flange 64 provides a smooth, rounded surface that resists the track movement and runoff without damaging or fraying the edge of the track 22. Sufficient resistance from the flange 64 can induce the track to re-center on the framework 26. The diverter flange 64 also disperses debris, dirt, snow etc. away from the track assembly 10.

Although a single retainer guide 50 is shown, guides 50 can be mounted to both sides of the track assembly 10. The guides 50 are typically provided only at the aft idler wheels 60, but can also be mounted to lay adjacent nose idler wheels 66.

Threaded tensioner assemblies 68 also project from the framework 26 and engage each axle that supports a nose idler wheel 66. The track tension is varied by extending and retracting the threaded tensioners 68.

Figure 7:
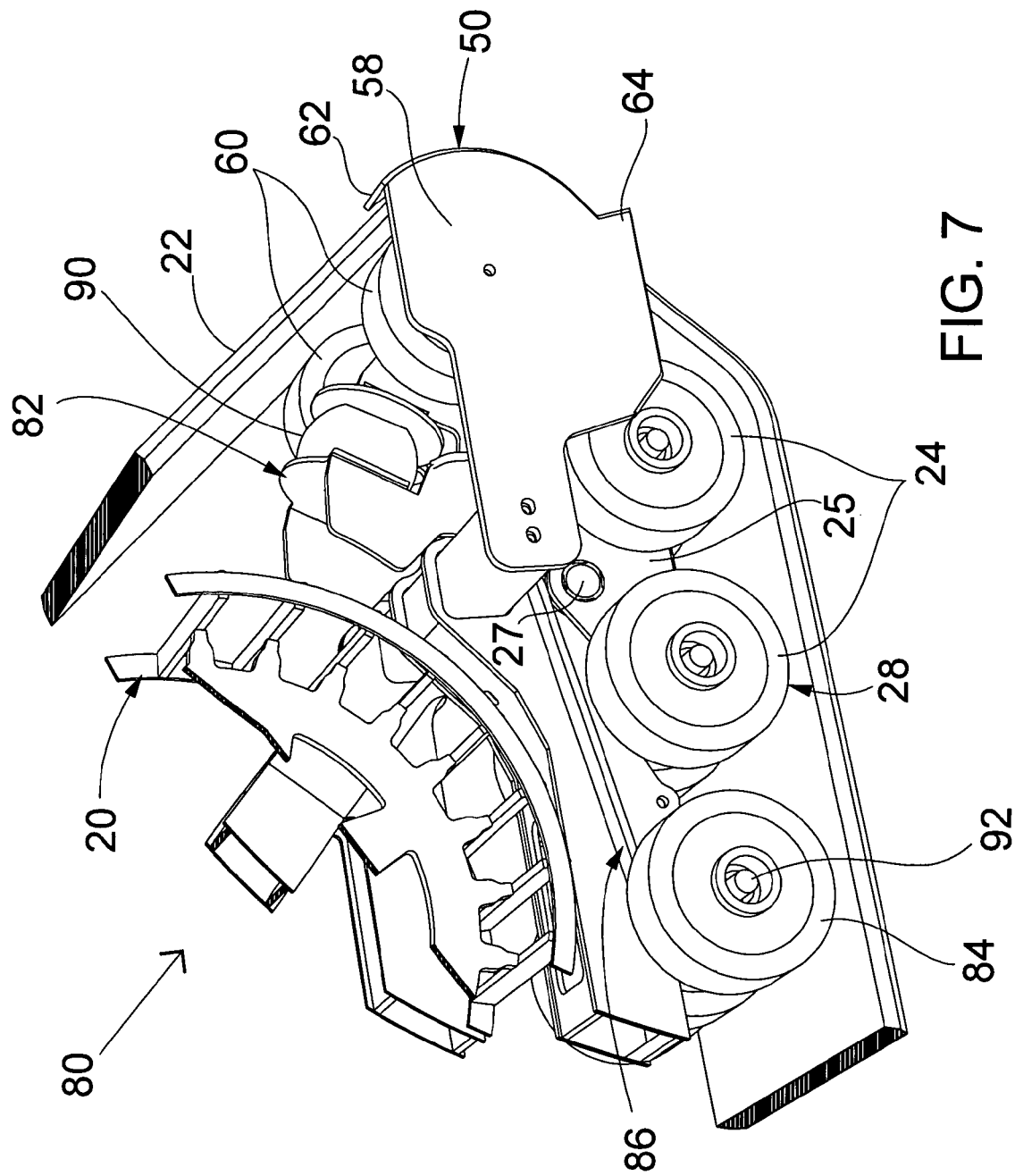
FIG. 7 depicts a perspective view to another track assembly having a bladder biased, outer rocker arm assembly that couples center sets of idler wheels to pivot from the track framework independent of inner sets of rocker arm mounted idler wheels.

FIG. 7 depicts an alternative track assembly 80 that includes the foregoing improvements and several independent rocker arm suspensions that support the track idler wheels. The track assembly 80 particularly includes two rocker arm assemblies 28 similar to those at the track assembly 10 that support four sets of 3-wide idler wheels 24 from the rocker arms 25. A separate rocker arm, idler wheel suspension 82 independently and resiliently supports and biases a set of interior, center idler wheels 84 mounted below the improved sprocket assembly 20 and forward of the aft rocker arm assembly 28.

The sets of interior idler wheels 84 are affixed to a rocker arm 86 that pivots at the same axle 27 as the aft rocker arm assembly 28. The arm 86 however pivots from the framework 26 independent of the rocker arm assembly 28. A resilient, compressible member 90 (e.g. compressively-resilient elastomer member, coiled spring or air bladder) secured to between the framework 26 and rocker arm 86 engages and biases the rocker arm 86 and the idler wheels 84 to an equilibrium condition (e.g. flat, level center as shown at FIG. 7). The idler wheels 84 rotate about axles 92 secured to the rocker arm 86. The independent pivoting of the rocker arm suspensions 28 and 82 also enhance the terrain conforming movements of the track 22.

While the invention is shown and described with respect to presently preferred track assemblies and several considered improvements, modifications and/or alternatives thereto, still other track assemblies and arrangements may be suggested to those skilled in the art. It is to be appreciated therefore that the foregoing track assembly improvements can be arranged in different combinations. For example, either or both of the idler wheel rocker arm suspensions can be provided at a track assembly outfitted with either or both of the improved drive sprocket assembly and/or track guide retainer. The track guide retainer can be used alone with any track assembly or multiple guides can be fitted to a track assembly. The sprocket drive rings can be configured differently and/or be outfitted with different drive teeth. The improved track assemblies can also be mounted to a variety of different vehicles whose operation will essentially remain the same, yet with all the advantages offered by tracks. The foregoing description should therefore be construed to include all those embodiments within the spirit and scope of the following claims.

What is claimed is:

1. A track assembly for a vehicle comprising:
   a) a framework including a drive track, a drive sprocket and a plurality of idler wheels, wherein the drive track is trained to circumferentially rotate in endless fashion about said drive sprocket and idler wheels, wherein a plurality of drive lugs project from an interior surface of said track in laterally displaced parallel columns, wherein said idler wheels are arranged in a plurality of sets, wherein each set comprises a plurality of laterally displaced idler wheels, wherein said idler wheels contact said interior surface intermediate and laterally adjacent the columns of drive lugs; and
   b) wherein said drive sprocket comprises a hub piece adapted to mount to a supporting vehicle, wherein a plurality of drive teeth are secured to said hub piece, wherein said drive teeth radially project from said hub and span the columns of drive lugs, wherein each of said drive teeth is shaped to include a plurality of drive surfaces that project from a link piece to contact the drive lugs in each of said columns, wherein a recessed channel is defined between the link piece and drive surfaces of each drive tooth, and wherein the idler wheels are vertically interlaced and aligned with the drive surfaces to permit the link pieces to pass over the idler wheels and the idler wheels to pass in the channel between and adjacent the drive surfaces without contacting the drive teeth and drive lugs.

2. A track assembly as set forth in claim 1 wherein at least two of said sets of idler wheels are mounted to a rocker arm that is resiliently mounted to pivot from said framework.

3. A track assembly as set forth in claim 2 wherein a third set of idler wheels is mounted to a second rocker arm resiliently mounted to pivot from said framework, wherein a compressively resilient member biases said second rocker arm relative to said framework.

4. A track assembly as set forth in claim 3 wherein said compressively resilient member comprises an air filled envelope mounted between surfaces of said second arm and said framework.

5. A track assembly as set forth in claim 1 wherein said drive surfaces and link piece of each of said plurality of teeth exhibits a C-shape.

6. A track assembly as set forth in claim 1 including a retainer member mounted to said framework to partially encompass one peripheral edge of said track to engage and prevent said track from laterally disengaging from said framework.

7. A track assembly as set forth in claim 6 wherein said retainer member includes a first flange piece that transversely projects to overlie a portion of a ground engaging surface of said track.

8. A track assembly as set forth in claim 7 wherein said retainer member includes a second flange piece that transversely projects at an acute angle relative to said ground engaging surface to contact said track and direct said track to maintain a predetermined alignment with said framework.

9. A track assembly as set forth in claim 1 including a ring piece mounted to radially project from the hub piece and support said drive teeth.

10. A track assembly as set forth in claim 9 wherein said link piece of each tooth is mounted to said ring piece.

11. A track assembly as set forth in claim 9 wherein said ring piece comprises first and second laterally displaced annular rings.

12. A track assembly as set forth in claim 11 wherein the link piece of each drive tooth transversely spans said first and second rings.

13. A track assembly as set forth in claim 8 wherein said second flange piece projects at an angle in the range of 20° to 50° relative to the ground engaging surface of said track.

14. A track assembly for a vehicle comprising:
a) a framework including a drive track, a drive sprocket and a plurality of idler wheels, wherein the drive track is circumferentially trained about said drive sprocket and idler wheels to rotate in endless fashion, wherein a plurality of drive lugs project from an interior surface of said track in aligned rows along laterally displaced parallel columns, wherein said idler wheels are arranged in a plurality of sets, wherein each set comprises a plurality of laterally displaced idler wheels, wherein said idler wheels contact said interior surface intermediate and laterally adjacent the columns of drive lugs; and
b) wherein said drive sprocket comprises a hub piece having a flange that radially projects from the hub, wherein a plurality of drive teeth are secured to said flange, wherein said drive teeth radially project from said flange and span the columns of drive lugs, wherein each of said drive teeth is shaped to include a plurality of drive surfaces that project from a link piece to contact the drive lugs in each of said rows, wherein a recessed channel is defined between the link piece and drive surfaces of each drive tooth, and wherein the idler wheels are vertically interlaced and aligned with the drive surfaces to permit the link pieces to pass over the idler wheels and the idler wheels to pass in the channel between and adjacent the drive surfaces without contacting the drive teeth and drive lugs.

15. A track assembly as set forth in claim 14 wherein the drive surfaces project from opposite ends of the link piece of each of said plurality of drive teeth to exhibit a C-shape.

16. A track assembly as set forth in claim 14 including a retainer member mounted to partially encompass a portion of only one peripheral edge of said track to direct said track to maintain a predetermined alignment to said framework.

17. A track assembly as set forth in claim 16 wherein said retainer member includes a first flange piece that orthogonally projects to overlie a portion of a ground engaging surface of said track.

18. A track assembly as set forth in claim 17 wherein said retainer member includes a second flange piece that projects at an angle in the range of 20° to 50° relative to the ground engaging surface of said track to contact and direct said track to maintain the predetermined mounting alignment.

19. A track assembly as set forth in claim 14 wherein a plurality of said idler wheels are mounted to a rocker arm and a compressively resilient member biases said rocker arm to pivot from said framework.

20. A track assembly as set forth in claim 14 including a retainer member mounted to said framework to overlie and engage one peripheral edge of said track to prevent said track from detaching from said framework.

21. A track assembly as set forth in claim 14 wherein a plurality of said idler wheels are mounted to a plurality of rocker arms and including a compressively resilient member mounted to resiliently bias one of said rocker arms to pivot from said framework.

22. A track assembly as set forth in claim 14 wherein said flange includes a detachable ring piece comprising first and second laterally displaced annular rings and wherein each drive tooth transversely spans between said first and second rings.

23. A track assembly as set forth in claim 14 wherein said drive surfaces project in parallel relation from opposite ends of said link piece.

24. A track assembly as set forth in claim 21 including a retainer member having a first flange piece that transversely projects to overlie one peripheral edge portion of a ground engaging surface of said track and a second flange piece that projects at an acute angle relative to said ground engaging surface to contact said track and direct said track to maintain a predetermined alignment with said framework.

25. A track assembly as set forth in claim 14 wherein fore and aft sets of idler wheels are rigidly mounted to fore and aft ends of said framework, wherein a third set of idler wheels is mounted intermediate said fore and aft sets of idler wheels to a rocker arm resiliently mounted to pivot from said framework, and wherein a compressively resilient member resiliently biases said rocker arm relative to said framework and said third set of idler wheels into contact with the interior surface of said track.

26. A track assembly for a vehicle comprising:
a) a framework including a drive track, a drive sprocket and a plurality of sets of laterally displaced idler wheels spanning and supporting the interior surface of said drive track, wherein first and second sets of idler wheels are rigidly mounted to said framework to rotate at fore and aft ends of said framework, wherein a third set of idler wheels is mounted intermediate said fore and aft sets to a rocker arm resiliently mounted to pivot from said framework, and wherein a compressively resilient member biases said rocker arm relative to said framework and said third set of idler wheels into contact with said interior surface, wherein the drive track is circumferentially trained about said drive sprocket and idler wheels to rotate in endless fashion, wherein a plurality of drive lugs project from the interior surface of said track in laterally displaced parallel columns, and wherein said idler wheels contact said interior surface adjacent and intermediate the columns of drive lugs;
b) wherein said drive sprocket comprises a hub piece adapted to mount to a supporting vehicle, wherein a plurality of drive teeth are secured to said hub piece, wherein said drive teeth radially project from said hub and span the columns of drive lugs, wherein each of said drive teeth is shaped to include a plurality of drive surfaces that project from a link piece to contact the drive lugs in each of said columns, wherein a recessed channel is defined between the link piece and drive surfaces of each drive tooth, and wherein the idler wheels are vertically interlaced and aligned with the drive surfaces to permit the link pieces to pass over the idler wheels and the idler wheels to pass in the channel between and adjacent the drive surfaces without contacting the drive teeth and drive lugs; and c) a retainer member including a first flange piece that transversely projects to overlie a ground engaging track surface and a second flange piece that transversely projects at an acute angle relative to the ground engaging surface to contact said track and direct said track to maintain a predetermined mounting orientation to said framework.

* * * * *